(12) United States Patent
Bhamidipati et al.

(10) Patent No.: US 10,275,532 B2
(45) Date of Patent: Apr. 30, 2019

(54) METHOD AND SYSTEM FOR CONTENT DISCOVERY

(71) Applicant: InterDigital CE Patent Holdings, SAS, Paris (FR)

(72) Inventors: Sandilya Bhamidipati, Palo Alto, CA (US); Branislav Kveton, San Jose, CA (US)

(73) Assignee: InterDigital CE Patent Holdings, Paris (FR)

(*) Notice: Subject to any disclaimer, the term of this patent is extended or adjusted under 35 U.S.C. 154(b) by 581 days.

(21) Appl. No.: 14/762,512

(22) PCT Filed: Jan. 23, 2014

(86) PCT No.: PCT/US2014/012653
§ 371 (c)(1),
(2) Date: Jul. 22, 2015

(87) PCT Pub. No.: WO2014/116774
PCT Pub. Date: Jul. 31, 2014

(65) Prior Publication Data
US 2015/0363500 A1 Dec. 17, 2015

Related U.S. Application Data

(60) Provisional application No. 61/756,021, filed on Jan. 24, 2013.

(51) Int. Cl.
*G06F 17/30* (2006.01)
*G06F 3/0484* (2013.01)
(Continued)

(52) U.S. Cl.
CPC ...... *G06F 17/30867* (2013.01); *G06F 3/0482* (2013.01); *G06F 3/04842* (2013.01);
(Continued)

(58) Field of Classification Search
CPC ......... G06F 17/30867; G06F 17/30601; G06F 17/30876; G06F 17/30; G06F 3/04842; G06F 3/04883; G06F 3/0482
See application file for complete search history.

(56) References Cited

U.S. PATENT DOCUMENTS 6,005,597 A 12/1999 Barrett et al.
6,029,172 A † 2/2000 Jorna
(Continued)

FOREIGN PATENT DOCUMENTS

CN 102883228 A 1/2013
GB 2387676 10/2003
(Continued)

OTHER PUBLICATIONS

"Amazon Mechanical Turk," http://www.mturk.com, 2015.
(Continued)

*Primary Examiner* — Anh Ly
(74) *Attorney, Agent, or Firm* — Volpe and Koenig, P.C.

(57) ABSTRACT

A system, method and graphic user interface for facilitating content discovery. The system and method including the selection (1402) of a number of display regions based on a display type, and the selection (1404) of item categories to be displayed in the display regions in accordance with a content discover process. The content discovery process is a greedy process that includes a multi-way search process (700) that tracks a user's item category selections and removes non-selected item categories displayed in the displayed regions from future display in the display regions during the content discovery process, and an item category selection process (900) that selects at least one item category that has not been displayed in the display regions and was not previously non-selected during the multi-way search process (700).

24 Claims, 13 Drawing Sheets

(51) Int. Cl.
*G06F 3/0488* (2013.01)
*G06F 3/0482* (2013.01)
*H04N 21/00* (2011.01)
*H04N 21/482* (2011.01)

(52) U.S. Cl.
CPC .......... *G06F 3/04883* (2013.01); *G06F 17/30* (2013.01); *G06F 17/30601* (2013.01); *G06F 17/30876* (2013.01); *H04N 21/00* (2013.01); *H04N 21/482* (2013.01)

(56) References Cited

U.S. PATENT DOCUMENTS

| | | | |
|---|---|---|---|
| 7,117,163 | B1 | 10/2006 | Lyer et al. |
| 7,840,568 | B2 | 11/2010 | Purgang et al. |
| 9,158,440 | B1 † | 10/2015 | Lider |
| 2002/0198882 | A1* | 12/2002 | Linden .............. G06F 17/30867 707/E17.109 |
| 2004/0019609 | A1* | 1/2004 | Orton, III .............. G06Q 10/10 707/E17.005 |
| 2004/0064229 | A1* | 4/2004 | Stout ...................... B62D 6/002 701/44 |
| 2004/0201544 | A1* | 10/2004 | Love ..................... G06F 3/1423 345/1.1 |
| 2005/0234881 | A1 | 10/2005 | Burago et al. |
| 2007/0150368 | A1* | 6/2007 | Arora ..................... G06Q 30/02 705/26.1 |
| 2007/0256101 | A1 | 11/2007 | Kim |
| 2008/0189740 | A1 | 8/2008 | Carpenter et al. |
| 2008/0250312 | A1 | 10/2008 | Curtis |
| 2009/0029687 | A1* | 1/2009 | Ramer .............. G06F 17/30905 455/414.3 |
| 2009/0064229 | A1 | 3/2009 | Morris |
| 2010/0153999 | A1 | 6/2010 | Yates |
| 2010/0235317 | A1 † | 9/2010 | Yu et al. |
| 2010/0312572 | A1* | 12/2010 | Ramer ................... G06Q 30/02 705/1.1 |
| 2011/0093337 | A1 | 4/2011 | Granit et al. |
| 2011/0247031 | A1* | 10/2011 | Jacoby ............... H04N 21/4351 725/25 |
| 2011/0295775 | A1 | 12/2011 | Wang et al. |
| 2012/0017147 | A1 | 1/2012 | Mark |
| 2013/0031216 | A1 | 1/2013 | Willis et al. |
| 2013/0254308 | A1 † | 9/2013 | Rose et al. |
| 2013/0262618 | A1* | 10/2013 | Khan ..................... G06Q 30/06 709/217 |
| 2013/0290095 | A1* | 10/2013 | Crinon ............... G06Q 30/0246 705/14.45 |
| 2014/0236720 | A1* | 8/2014 | Shunock ................ G06Q 30/02 705/14.54 |

FOREIGN PATENT DOCUMENTS

| | | |
|---|---|---|
| WO | WO0017792 | 3/2000 |
| WO | WO0158145 | 8/2001 |
| WO | WO0211440 | 2/2002 |

OTHER PUBLICATIONS

J. Spencer, "Randomization, derandomization and antirandomization: Three games," Theoretical Computer Science, vol. 131, No. 2, pp. 415-429, 1994.
D. Johnson, "Approximation algorithims for combinatorial problems," Journal of Computer and System Sciences, vol. 9, No. 3, pp. 256-278, 1974.
S. Dasgupta, W.S. Lee and P. Long, "A theoretical analysis of query selection for collaborative filtering," Machine Learning, vol. 51, No. 3, pp. 283-298, 2003.
"The Internet Movie Database (IMDb)," http://www.imdb.com/ JAN2012.
"Library Thing," http://www.librarything.com/2012.
S. Kirkpatrick, C.D. Gelatt and M.P. Vecchi, "Optimization by simulated annealing," Science, vol. 220, No. 4598, pp. 671-680, 1983.
S. Dasgupta, "Analysis of a greedy active learning strategy," in Advances in Neural Information Processing Systems 17, 2005., pp. 337-344.
R. Nowak, "The geometry of generalized binary search," IEEE Transactions on Information Theory, vol. 57, No. 12, pp. 7893-7906, 2011.
A. Torralb, R. Fergus and W. Freeman, "80 million tiny images: A large data set for nonparametric object and scene recognition," IEEE Transactions on Pattern Analysis and Machine Intelligence, vol. 30, No. 11, pp. 1958-1970,2008.
http://20q.net, 2012.
Akinator, http://us.akinator.com, Jan. 2, 2012.
Bishop, C., Pattern Recognition and Machine Learning, Springer-Verlag, New York, NY 2006.
www.bookcrossing.com, Jan. 3, 2012.
Branson, S., Wah, C., Babenko, B., Schroff, F., Welinder, P., Perona, P. and Belongie, S., Visual Recognition with humans in the loop. In Proceedings of the 11th European Conference Computer Vision (2010).
http://nadafy.com/20QuestionsGameIntro.aspx, 2012.
Shannon, C.E., A Mathematical Theory of Communication. Bell Systems Technical Journal 27 (1948), 379-426, 623-656.
Ziegler, C.-N., McNee, S.M., Konstan, J.A., and Lausen, G. Improving recommendation lists through topic diversification. In Proceedings of the 14th International Conference on World Wide Web (New York, NY, USA, 2005). www '05, acm, pp. 22-32.
Cesa-Bianchi, N., and Lugosi, G. Prediction, Learning and Games. Cambridge University Press, New York, NY 2006.
Pelc, A. Searching Games with errors—fifty years of coping with liars. Theor. Comput. Sci. 270 (Jan. 2002), 71-100.
Bhamidipati et al., "Minimal Interaction Search: Multi-Way Search with Item Categories", Intelligent Techniques for Web personalization and Recommendation:Papers from the AAAI 2013 Workshop, pp. 9-15.

\* cited by examiner
† cited by third party

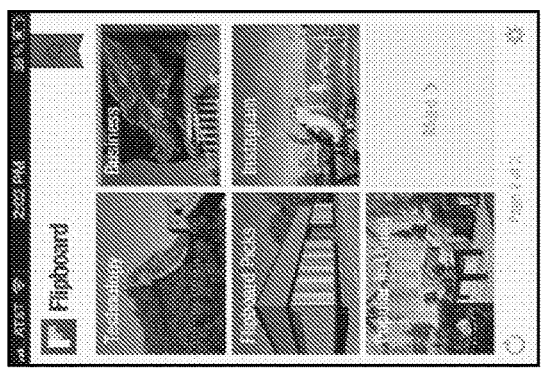
(d) Apple's Flipboard.
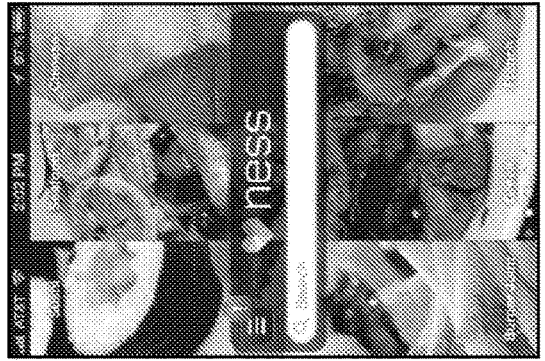
(c) Likeness.
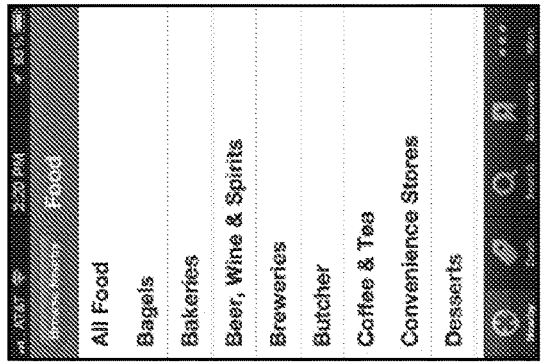
(b) Yelp.
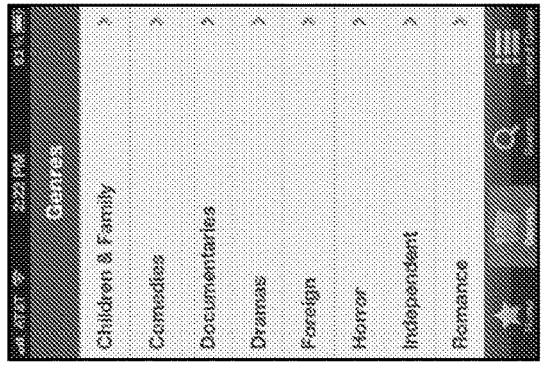
(a) Netflix.
FIG. 5

600

Algorithm 1 Generalized multi-way search with $k$ categories.

Inputs:
   hypothesis space $H$
   $m$ item categories $S$
   number of item categories $k$ in a question

Algorithm:
   $U_0 \leftarrow H$
   $t \leftarrow 1$
   while ($|U_{t-1}| > 1$)
      compute a question with $k$ item categories:
         $A^* \leftarrow \arg\max_A fu_{t-1}(A)$
      if (the answerer chooses the category $r_t \leq k$)
         $U_t \leftarrow U_{t-1} \cap A_{r_t}$
   else
         $U_t \leftarrow U_{t-1} \cap \overline{\bigcup_{i=1}^{k} A_i}$
   $t \leftarrow t + 1$

Outputs:
   target item $o \in U_t$

Algorithm 2 Greedy selection of questions.

Inputs:
    version space $U$
    $m$ item categories $S$
    number of item categories $k$ in a question
    upper bounds $\mathcal{L}$ on the size of sets in $A^g$

Algorithm:
    $A^g \leftarrow \{\}$
    $t \leftarrow 1$
    for all $L \in \mathcal{L}$
        choose an active set $S_L \leftarrow \{S \in S : |S \cap U| \leq L\}$
        $A_L \leftarrow$ greedily cover $U$ with $k$ sets from $S_L$
        if $(f(A_L) > f(A^g))$
            $A^g \leftarrow A_L$

Outputs:
    $k$ question categories $A^g$

FIG. 8

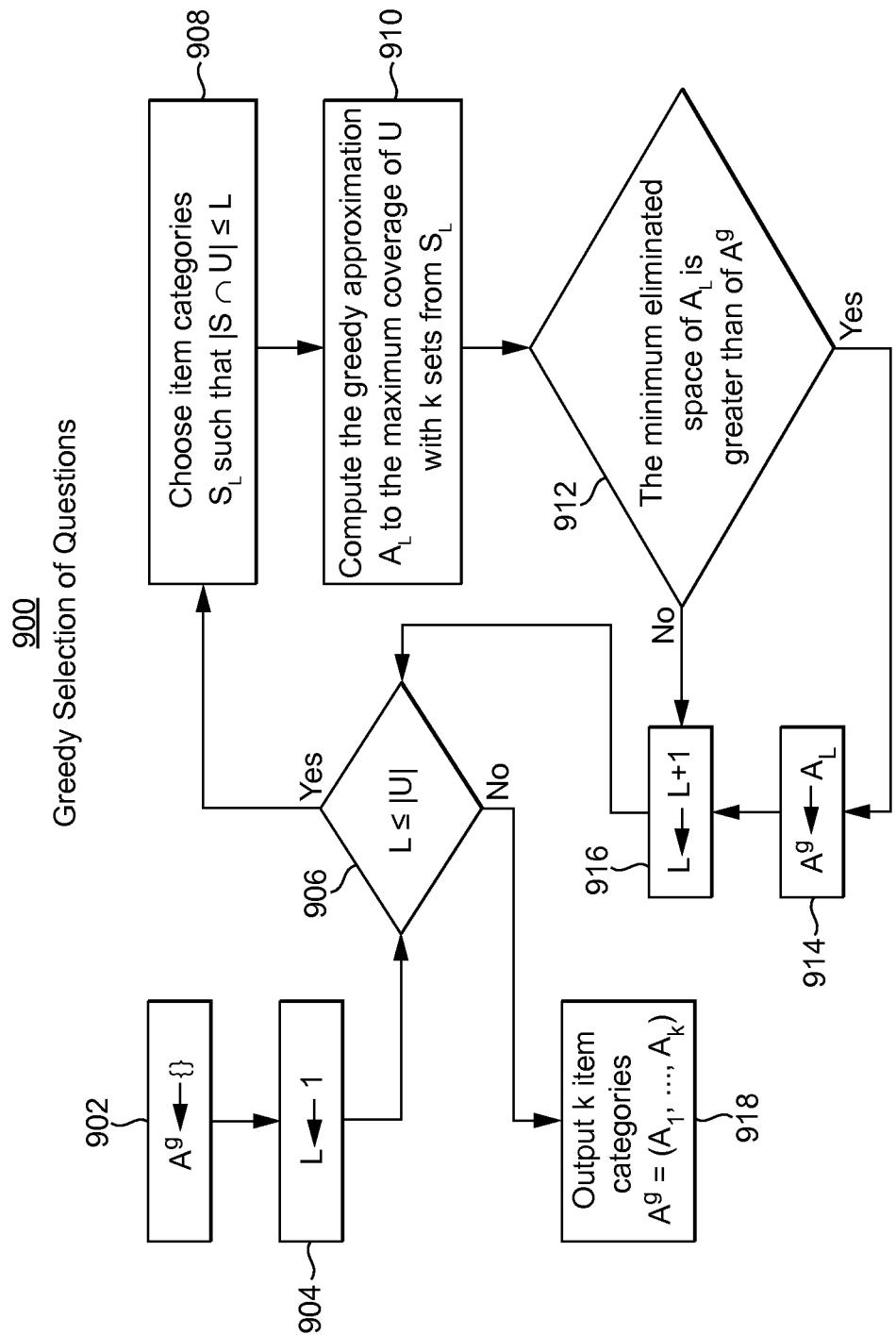

1400

```
┌─────────────────────────────┐
│  Selecting a Number of Display │
│ Regions Based on a Display Type │
│            1402             │
└─────────────────────────────┘
              │
              ▼
┌─────────────────────────────┐
│ Selecting Item Categories to Display │
│  in the Display Regions Based on a  │
│     Content Discovery Process       │
│              1404                   │
└─────────────────────────────┘
```

FIG. 14

METHOD AND SYSTEM FOR CONTENT DISCOVERY

REFERENCE TO RELATED PROVISIONAL APPLICATION

This application claims the benefit, under 35 U.S.C. § 365 of International Application PCT/US 2014/012653, which was filed 23 Jan. 2014, which was published in accordance with PCT Article 21(2) on 31 Jul. 2014 in English, and which claims the benefit of United States provisional patent application No. 61/756,021, filed 24 Jan. 2013.

TECHNICAL FIELD OF THE INVENTION

The present disclosure generally relates to digital content systems and methods for searching through a large amount of media content efficiently and in a graphical way, and more particularly, to a system, method and graphic user interface for facilitating content discovery.

BACKGROUND OF THE INVENTION

Home entertainment systems, including television and media centers, are converging with the Internet and providing access to a large number of available sources of content, such as video, movies, TV programs, music, etc. This expansion in the number of available sources necessitates a new strategy for navigating a media interface associated with such systems and making content recommendations and selections.

The large number of possible content sources creates an interface challenge that has not yet been successfully solved in the field of home media entertainment. This challenge involves successfully presenting users with a large number of elements (programs, sources, etc.) without the need to tediously navigate through multiple display pages or hierarchies of content.

Further, most existing search paradigms make an assumption that the user knows what they are looking for when they start, whereas often, a mechanism to allow a process of discovery and cross linkage is more desirable or appropriate.

One approach for allowing a process of discovery and cross linkage is the tracking a user's viewing/purchasing habits over a period of time. However, tracking user's viewing/purchasing habits over a long time period to generate relevant recommendations also has the drawback of being time consuming.

The present disclosure is directed towards overcoming these drawbacks.

SUMMARY

A system, method and graphic user interface for facilitating content discovery. The system and method including the selection (1402) of a number of display regions based on a display type, and the selection (1404) of item categories to be displayed in the display regions in accordance with a content discover process. The content discovery process is a greedy process that includes a multi-way search process (700) that tracks a user's item category selections and removes non-selected item categories displayed in the displayed regions from future display in the display regions during the content discovery process, and an item category selection process (900) that selects at least one item category that has not been displayed in the display regions and was not previously non-selected during the multi-way search process (700).

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views:

FIG. 5 illustrates exemplary embodiments of exemplary user interfaces; disclosure;

FIG. 6 is an exemplary embodiment of a generalized multi-way search algorithm of the present disclosure;

FIG. 8 is an exemplary embodiment of a greedy selection algorithm of the present disclosure;

FIG. 9 is an exemplary embodiment of a flowchart illustrating a selection process of the present disclosure based on the algorithm of FIG. 8;

FIG. 14 is an exemplary embodiment of a flowchart illustrating a recommendation process of the present disclosure.

Figure 1:
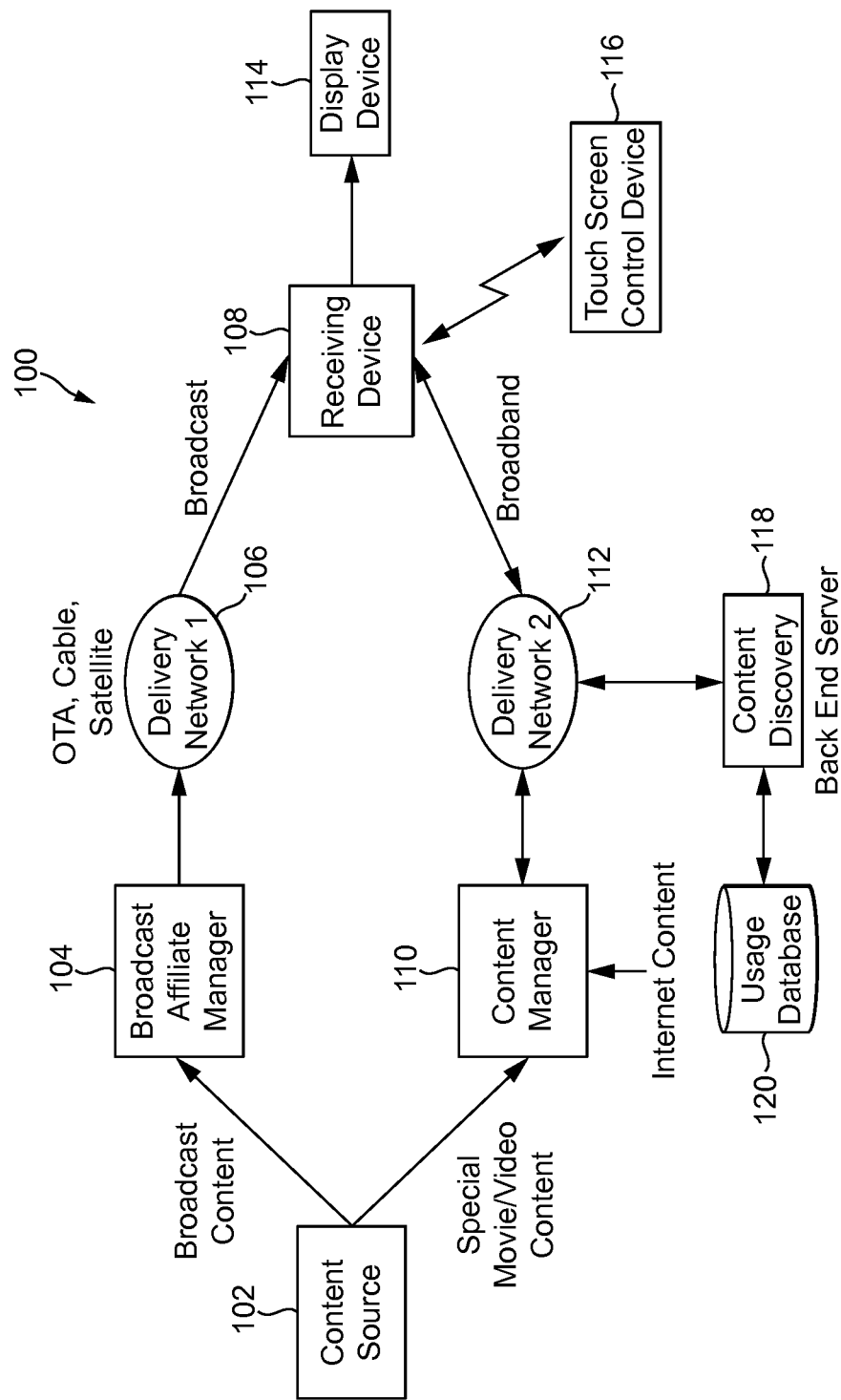
FIG. 1 is a block diagram of an exemplary system for delivering content in accordance with the present disclosure.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The proposed disclosure is directed towards a method and system for content discovery. More specifically a method and system for content discovery recommends a desired item from a catalog of items (e.g., movies, music, cuisine, etc.) to a user with a minimum number of questions or recommendations.

Turning now to FIG. 1, a block diagram of an embodiment of a system 100 for delivering content to a home or end user is shown. The content may originate from a content source 102, such as a movie studio, production house, or the like. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and may be embodied as a set top box/digital video recorder (DVR), a gateway, a modem, etc. Further, the receiving device 108 may act as entry point, or gateway, for a home network system that includes additional devices configured as either client or peer devices in the home network.

A second form of content is referred to as special content. Special content may include content delivered as premium viewing, pay-per-view, or other content otherwise not provided to the broadcast affiliate manager, e.g., movies, video games, music, e-books, movie posters, album covers, cuisine data or other media elements. In many cases, the special content may be content requested by the user. The special content may be delivered to a content manager 110. The content manager 110 may be a service provider, such as an Internet website, affiliated, for instance, with a content provider, broadcast service, or delivery network service. The content manager 110 may also incorporate Internet content into the delivery system. The content manager 110 may deliver the content to the user's receiving device 108 over a separate delivery network, delivery network 2 (112). Delivery network 2(112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The receiving device 108 may receive different types of content from one or both of delivery network 1 and delivery network 2. The receiving device 108 processes the content, and provides a separation of the content based on user preferences and commands. The receiving device 108 may also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 may be a conventional 2-D type display or may alternatively be an advanced 3-D display.

The receiving device 108 may also be interfaced to a second screen such as a touch screen control device 116. The touch screen control device 116 may be adapted to provide user control for the receiving device 108 and/or the display device 114. The touch screen device 116 may also be capable of displaying video content. The video content may be graphics entries, such as user interface entries (as discussed below), or may be a portion of the video content that is delivered to the display device 114. The touch screen control device 116 may interface to receiving device 108 using any well-known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

Optionally, receiving or media device 108 and touch screen control device 116 may be integrated into the same device. Examples of media devices with a touch screen include, but are not limited to, computers, laptops, wireless phones, cell phones, smart phones, personal media players, MP3 players, personal digital assistants (PDAs), tablet devices, digital video recorders, gateways, and the like. For purposes of the specification, the term receiving or media device can encompass all of these types of devices.

In the example of FIG. 1, the system 100 also includes a back end server 118 and a usage database 120. As discussed in further detail below, the back end server 118 may include a content discovery application (e.g., a cuisine discovery application, music discover application, e-book discovery application, movie discovery application, or the like) that analyzes the selections (e.g., media asset or content selections) of a user and makes recommendations based on those selections. The usage database 120 may be where the selections for a user are stored (alternatively the selections or selection habits may be stored elsewhere in system 100 such as receiving device 108, 200 (e.g., in storage device 212 and/or control memory 220), control device 116, 300 and/or display device 114). In some cases, the usage database 120 may be part of the back end server 118. In the present example, the back end server 118 (as well as the usage database 120) is connected to the system 100 and accessed through the delivery network 2 (112). In the present example, the movie database may be located entirely on the backend server 118, and each question and answer is communicated between the user's device (114, 108 and 200, and/or 115 and 300) and the server 118. One advantage of this approach is that it can be easily scaled to large databases without the need to communicate the database to the frontend. One disadvantage to this approach is that the content discovery application would need an Internet connection. As discussed above, other implementations such has having the content discovery application and movie database reside in the display device 114, receiving device 108, 200, the touch screen control device 116, 300, or any combination of these devices is considered within the scope of the present disclosure. It should be noted that the content discovery application and algorithms contained therein may be implemented, in part, in Python code.

Figure 2:
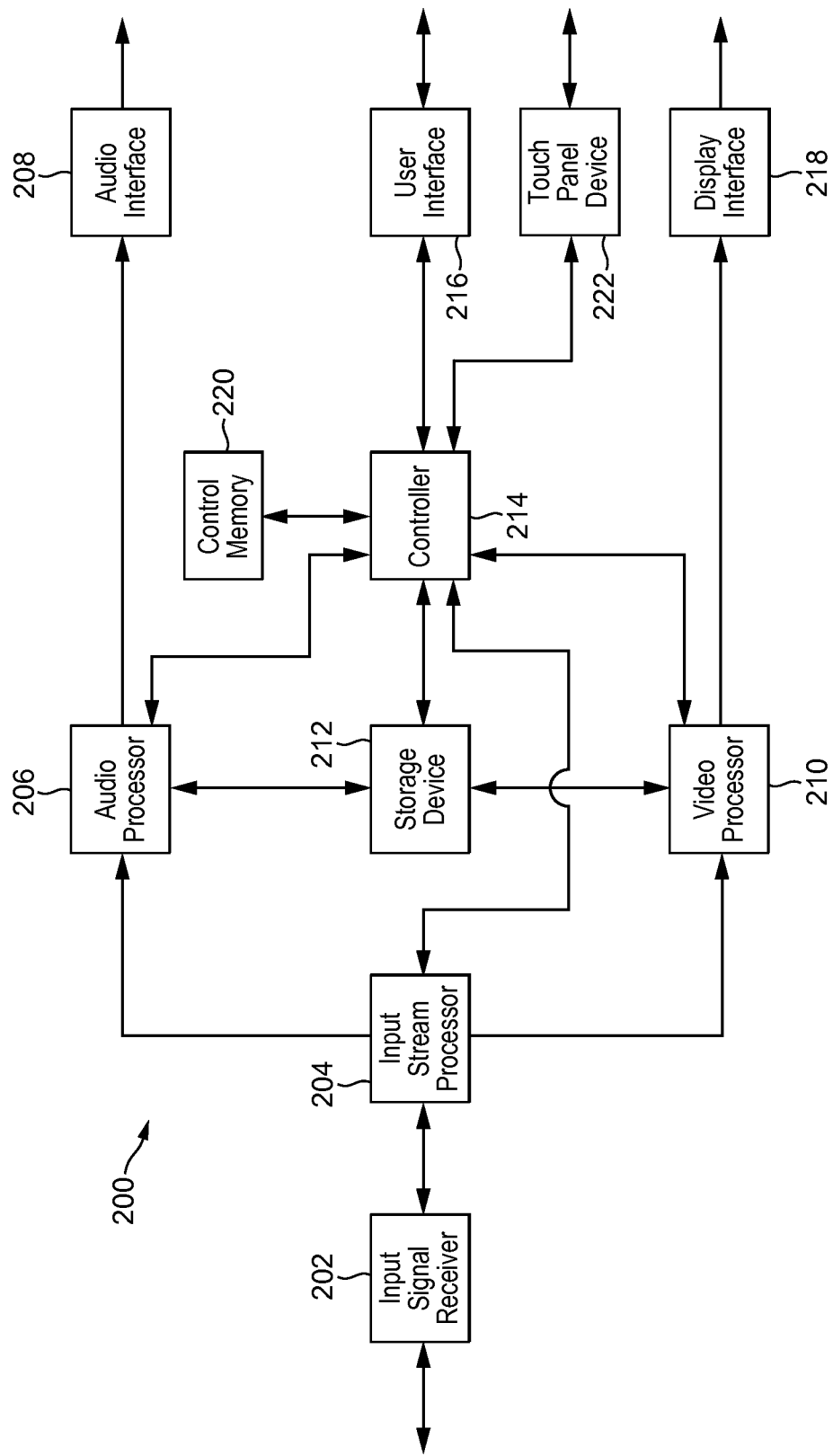
FIG. 2 is a block diagram of an exemplary set-top box/digital video recorder (DVR) in accordance with the present disclosure.

Turning now to FIG. 2, a block diagram of an embodiment of a receiving device 200 is shown. Receiving device 200 may operate similar to the receiving device described in FIG. 1 and may be included as part of a gateway device, modem, set-top box, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., user selections or answers, navigation instructions such as fast-forward (FF) and rewind (Rew) and the like, received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the content discovery results (e.g., in a three dimensional grid, two dimensional array, a one dimensional shelf, or the like).

The controller 214 is interconnected via a bus to several of the components of the device 200, including the input stream processor 204, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs content discovery and the creation and adjusting of the grid, array and/or shelf display representing the content, either stored or to be delivered via the delivery networks.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content. The database may be stored as a pattern of graphic elements, such as graphic elements containing content, various graphic elements used for generating a displayable user interface for display interface 218, and the like. Alternatively, the memory may store the graphic elements in identified or grouped memory locations and use an access or location table to identify the memory locations for the various portions of information related to the graphic elements. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 214 can be adapted to extract metadata, criteria, characteristics or the like from audio and video media by using audio processor 206 and video processor 210, respectively. That is, metadata, criteria, characteristics or the like that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that may be in an audio signal. Such audio watermarks can then be used to perform some action such as the recognition of the audio signal, security which identifies the source of an audio signal, or perform some other service. Furthermore, metadata, criteria, characteristics or the like, to support the actions listed above can come from a network source which are processed by controller 214.

Figure 3:
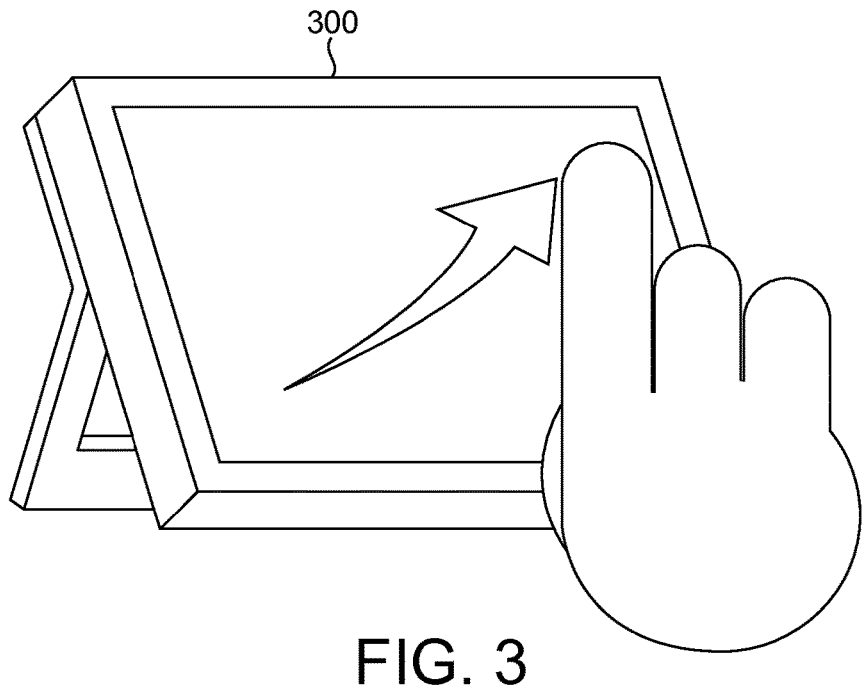
FIG. 3 is a perspective view of an exemplary remote controller, tablet and/or second screen device in accordance with an embodiment of the present disclosure.

Turning now to FIG. 3, the user interface process of the present disclosure employs an input device that can be used to express functions, such as user selections or answers, fast forward, rewind, etc. To allow for this, a tablet or touch panel device 300 (which is the same as the touch screen device 116 shown in FIG. 1 and/or is an integrated example of media device 108 and touch screen device 116) may be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 may simply serve as a navigational tool to navigate and select from the shelf, array or grid display. In other embodiments, the touch panel 300 will additionally serve as the display device allowing the user to more directly interact with the navigation through the display of content. The touch panel device may be included as part of a remote control device containing more conventional control functions such as activator, alphanumerical, directional, actuator buttons and the like. The touch panel 300 can also include at least one camera element. As described below, the touch panel device 300 (or display device 114) may utilize a content or media asset discovery function (see e.g., FIGS. 6-9 and 14) to provide content or media recommendations to a user.

Figure 4:
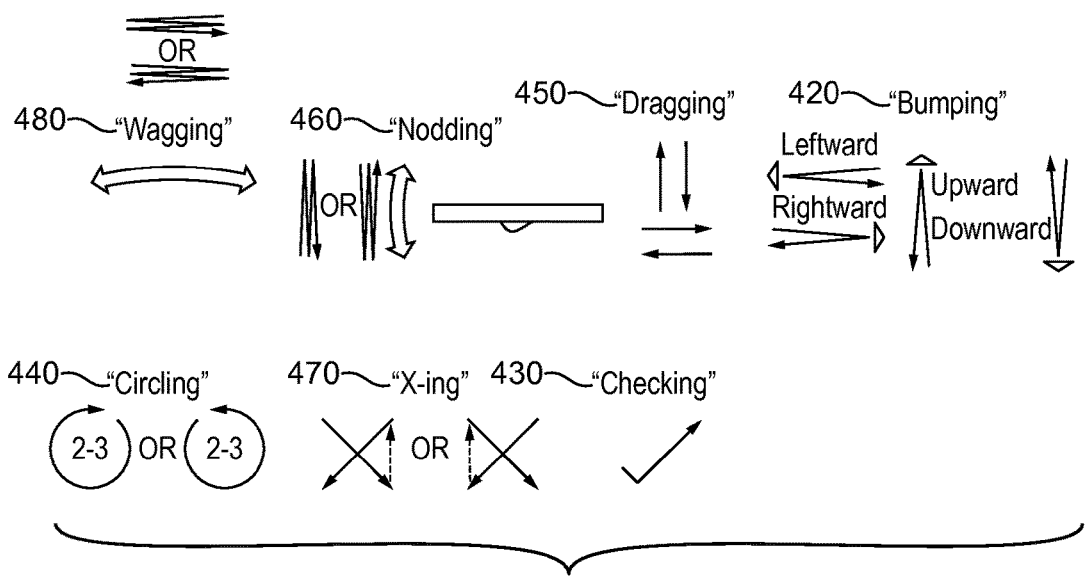
FIG. 4 illustrates a number of gestures in accordance with an embodiment of the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors (e.g., touch screen sensor and/or inertial sensors such as accelerometer and gyroscope sensors) may permit defining movement of a user's fingers on a touch screen or may even permit defining the movement of the controller itself in either one dimension or two dimensions. Two-dimensional motion, such as a diagonal, and a combination of yaw, pitch and roll can be used to define any three-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 may be used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 may be used to indicate "No", "Cancel", select "other" or to move displayed or virtual objects (e.g. cursors) horizontally.

Depending on the complexity of the sensor system, only simple one dimensional motions or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up/down, while a vertical sensor for up and down movement may be place in a different spot and used for channel up/down. In this way specific gesture mappings may be used. The user may interact with the user interface of the present disclosure using gestures performed on the tablet 300, as discussed in further detail below.

The following discussion sets forth a method, system and user interface for facilitating content discovery, in accordance with the present disclosure, such that a desired item from a catalog of items (e.g., movies, music, cuisine, etc.) is recommended to a user with a minimum number of questions or recommendations.

There is a lot of online tabular content such as lists of restaurants, movies, products and others, where each item has many attributes, some carefully curated using labels that are meaningful and commonly used, and others including user-specified with arbitrary labels. How does a user discover items of his or her interest in such collections?

One approach is to provide a search box and let users type in the attributes of their desired item, and provide a ranked list of items that are relevant to users' query. The other is to provide a series of navigation menus with categories that lets users browse and refine progressively to a list of desired items. Most websites like Netflix, Yelp and others allow combination of both. Still, typically, the attributes that users care about and use to search or navigate is quite large and most of the interfaces have some drawbacks. For example, the items are typically organized in a tree-like taxonomy, but the taxonomic tree is often unbalanced. Therefore, not all objects can be found in a small number of steps. Second, the branching factor of the tree can be huge, which may affect the usability of the system. For example, Yelp users can choose from 100 types of cuisine but only 9 can be displayed simultaneously on the screen of a cell phone (FIG. 5*b*). Under traditional interfaces, like in Netflix (FIG. 5*a*), users tend to stop after a few clicks via the menu (e.g., Foreign Cinema and Drama) and is then confronted with a list of movies which while satisfying their criteria, is still far from the ultimate item of their interest and includes many unwanted items (e.g., Foreign Drama Romance as well as Foreign Drama Thriller).

One point of focus of the present disclosure is that there are modern devices, such as tablets and smartphones, that users find very convenient. What interfaces will help users find content on such devices? Consider the example of a user using an tablet (e.g., iPad) application to find a movie. Movies have many of the standard attributes (such as genre, actors, etc.), as well as many of the nonstandard categories that are increasingly important in online platforms (such as Recently Viewed, Coming Soon, Editors Picks, NY Times review, etc.) and including user generated categories from reviews and other tagging services (e.g., better than Pulp Fiction, great car race, etc.). What is a suitable, intuitive way for users to find movies of their interest?

Emerging applications make use of two aspects of modern interfaces. First, there is a large screen. Instead of populating the large screen with large number categories in text with white background (FIGS. 5*a* and 5*b*), as is common in web applications, these applications typically use large thumbnails which communicate more about a user's choice than mere words (FIGS. 5*c* and 5*d*). Second, users prefer to interact via touch, so typically these applications let users choose by touching the thumbnails and flipping through the menu, rather than clicking to expand a long list of textual choices.

These features can be used in a straightforward way: take the existing interfaces on web applications and replace individual items with thumbnails, let users flip to scroll and choose by touching their choices rather than clicking via a mouse. But, equipped with these aspects, the present disclosure revisits the interface design for users and addresses how to make the user interface more intuitive and effective. More specifically, the present disclosure makes the following contributions:

First, formalize content discovery with modern interfaces as a multi-way search with k categories. The algorithm of the present disclosure presents a series of "queries" that correspond to k categories, and the user chooses from these categories (or chooses an "other" option). The present disclosure focuses on minimizing the number of such queries needed for a user to find his or her item of interest even in the worst case scenario (no matter the distribution of categories of the items or the item the user may wish to find).

Second, the present disclosure addresses the problem formally. Compared to the OPT$_k$ responses a user needs to make in the worst case scenario by an optimal, at best, algorithm, the present disclosure presents an algorithm and process that uses at most $(e/e-1)$OPT$_k$ log n queries provably, where n is the number of items. This Double Greedy algorithm and process uses a first greedy method (FIGS. 6 and 7) to eliminate as many possibilities as possible with each query, and a second greedy method (FIGS. 8 and 9) to find a query to ask that is close to the best query. The benefit of the double greedy algorithm and process is that it is very efficient compared to conventional approaches.

In general, content discovery may be visualized, as follows, in accordance with the present disclosure. Each item or graphic element (e.g., movie, restaurant, etc.) may represent a set of categories (e.g., genres, cuisine type, etc.). A user may have a specific target item in mind and may select items using a device with multiple choice capability such as a tablet or phone (e.g., touch screen device 116, 300) or a TV and remote (114 and 116, 130). The system, in accordance with the present disclosure, may show items representing multiple categories on the tablet, phone or TV. The user is allowed to interact and pick from the choices shown. The process of the present disclosure is repeated until the user has identified the target item that satisfies all their choices thus far. The content discovery system may be considered as a questioner and the user may be considered as an answerer. The questioner interacts with the answerer by asking questions (e.g., selecting displayed items or graphical elements representing item categories or by selecting "other" which may represent item categories not previously presented to the user). One main goal of the system of the present disclosure is to ensure that there are as few interactions or questions as possible before the user is presented with a desired item (e.g., movie, restaurant, etc.).

Consider, for example, a user using a tablet application to discover the restaurant of his or her choice. The present disclosure assumes restaurants have many of the standard attributes (such as cuisine type, price, etc.), many nonstandard categories (child friendly, good customer service, takeout or delivery options, decor, noise level, and the like), and user generated categories from reviews and other tagging services (e.g., name of the dessert chef of the day, fresh fish delivery date, etc.). The user may desire to find an Asian fusion restaurant with modern decor and child friendly.

How should one formalize this setting? One may consider the following:

What is the user interface that the system provides the user? The present disclosure assumes that the system presents individual categories. In the example above that will correspond to categories such as Asian, child friendly, etc. An alternative would be to assume that the system shows combination of categories, e.g., Asian and child friendly, pricey and Monday delivery, etc.

What is the precise choice for the user and what is his or her response? The present disclosure adapts the convention that on being shown k categories the user indicates one of the categories that describes their target. It is a natural tablet user interface interaction to allow the user to touch one of the categories and let the tablet application immediately proceed to the next round (i.e. show the user the next set of questions or item categories). This simple convention has two nuances. (i) Suppose more than one category describes the target item. In this case, the present disclosure assumes that the user indicates any of the applicable categories and do not burden the user to be more precise and pick the "most" applicable in any notion of distance. (ii) Suppose no category applies to the target item. This is possible because there are choices of k categories that do not cover the entire space of possible targets. Hence the present disclosure requires that the user is provided with a (k+1)-th choice for the rest of the item categories which comprise all combinations of item categories not represented in the k choices. Note that this (k+1)-th choice may not, in general, be captured by any single category.

Figure 7:
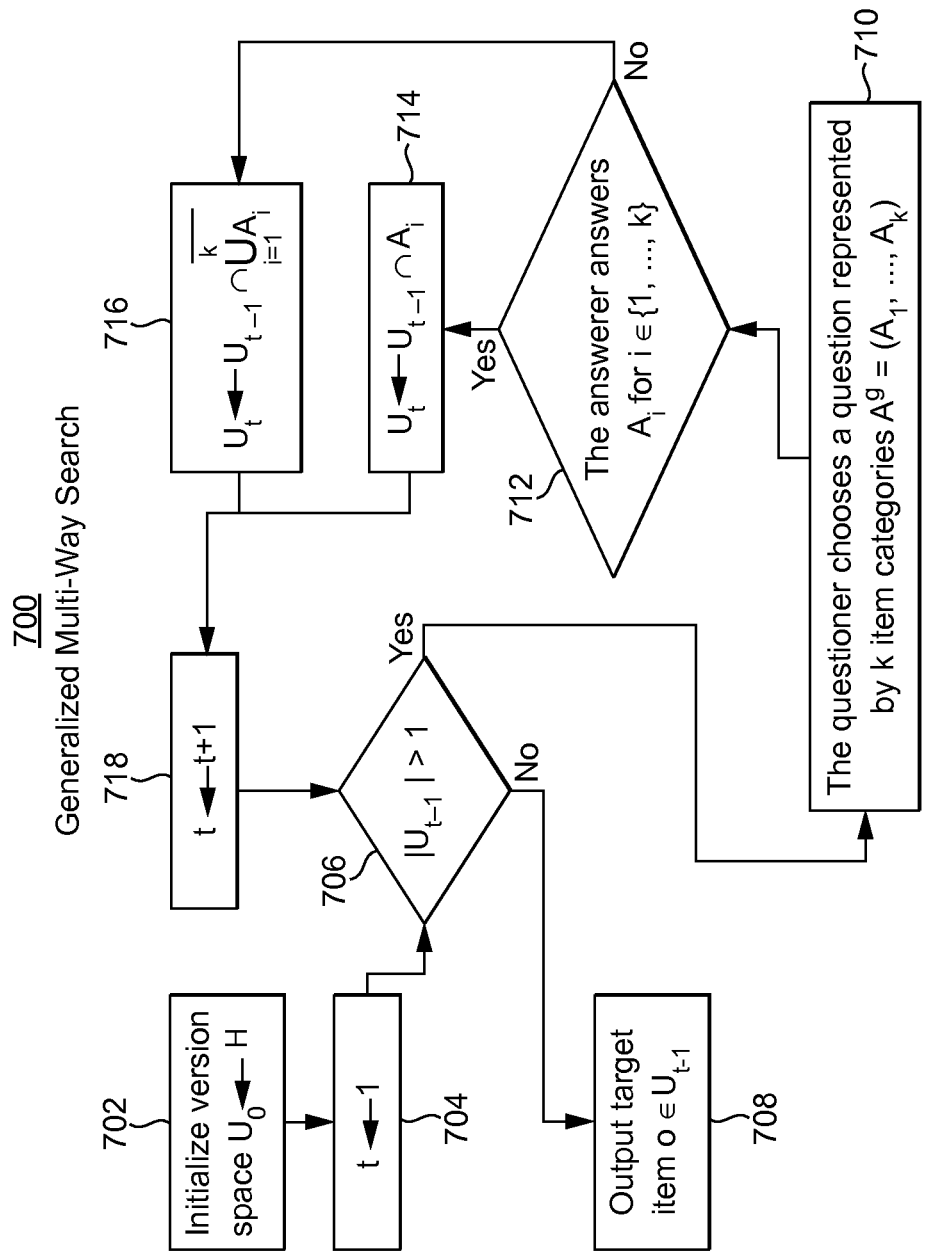
FIG. 7 is an exemplary embodiment of a flowchart illustrating a generalized multi-way search process of the present disclosure based on the algorithm of FIG. 6.

Referring now to FIG. 7, a generalized multi-way search process 700 of the present disclosure implementing a generalized multi-way search algorithm 600 of FIG. 6 is shown. At step 702, the version space (i.e., all items that satisfy all answers thus far) is initialized to all the items in the database (i.e., hypothesis space "H") and, at step 704, the counter, that tracks the number of questions asked, is set to 1. At step 706, it is determined if the number of items in the version space (i.e., all items that satisfy all answers thus far) is greater than 1. In other words, has the desired item(s) been found. It should be noted that 1 could represent a single item or multiple items (e.g., 3 items, 7 items, etc.) depending on the display (e.g. TV, phone, tablet, or the like) that is presenting the items. If the desired items have been found (i.e., the number of items in the version space is less than or equal to 1), at step 708, the item(s) are output and provided (e.g., displayed) to the user. If not, at step 710, a new question is generated for the user (i.e. the user is presented with k item categories +1 special category (e.g., other)) in accordance with the greedy selection algorithm 800 of FIG. 8 and greedy selection process 900 of FIG. 9, discussed in further detail below. Next, at step 712, the user answers the new question by selecting one of the k item categories or the special additional category (i.e. the user selects one of the k+1 categories). Then, in response to the user's answer (i.e. selection), the version space is updated. If the user selects one of the k categories then, at step 714, the version space is updated to contain the intersection between the category item that the user has chosen and the category items that the user had previously selected (i.e., the category items that have satisfied the users answers thus far). If the user selects the other category (i.e. the "+1" category) then, at step 716, the version space is updated to contain the intersection between complement of the union of the currently displayed categories (i.e. the category items that belong to none of the currently displayed categories. For example, if images representing crime, horror and comedy categories were being displayed to the user and the user selects "other", the complement of the union of these displayed images would be not crime, not horror and not comedy categories) and the category items that the user had previously selected. Next, at step 718, the counter "t" is incremented. Again, the counter reflects the number of questions that the user has been asked (i.e. the number of times the user has selected presented category items (k+1)). The process 700 then iteratively repeats until, at step 706, it is determined if the number of items in the version space (i.e., all items that satisfy all answers thus far) is less than or equal to 1.

Turning back to step 710, the goal of this step, in accordance with the present disclosure, is to maximize the number of eliminated item categories. One problem is that to compute the next optimal question (i.e. the optimal presentation of item categories to the user) the maximum number of item categories have to be eliminated during step 710. Maximizing the number of eliminated item categories is computationally complex because all possible item category combinations would traditionally have to be considered to maximize the number of eliminated item categories during this step. The greedy algorithm of the present disclosure efficiently computes a near-optimal question that is much less computationally complex than computation of the optimal question, thereby, speeding up the recommendation or question process of the present disclosure.

Turning now to FIG. 9, an item category selection process or greedy selection of questions process 900 of the present disclosure implementing a greedy selection of questions algorithm 800 of FIG. 8 is shown. In this process L represents the largest category in the optimal solution and U represents the current set of items satisfying the user's answers or selection thus far. First, at step 902, optimal solution $A^g$ (the set of chosen item categories) is initialized to empty. Next, at step 904, the upper bound on the size of the sets in the optimal solution is initialized L to 1. Afterwards, at step 906, it is determined if the upper bound L is smaller or equal to the size of the version space U. If so, at step 908, all item category sets that cover less than L items in the version space are chosen. Next, at step 910, from the chosen sets, k sets $A_L$ are chosen or computed. k sets $A_L$ cover the most items in the version space U. Afterwards, at step 912, it is determined if the k chosen sets have a greater utility than the optimal solution $A^g$ thus far. If so, at step 914, $A^g$ is replaced with $A_L$ and, at step 916, the upper bound on the size of the sets in the optimal solution L is increased by 1. If not, at step 916, the upper bound on the size of the sets in the optimal solution L is increased by 1. Then, at 906, it is again determined if the upper bound L is smaller or equal to the size of the version space U. If so, steps 908, 910, 912, 914, and 916 are iteratively repeated until the upper bound L is not smaller or equal to the size of the version space U. It should be noted that the loop from step 906 to step 912 may be considered a FOR LOOP over all L=1, . . . , |U|. L is unknown in advance and therefore the solution (step 910) is computed or all L and then the best solution is chosen (steps 912 and 914). Once it is determined that the upper bound L is not smaller or equal to the size of the version space U then, at step 918, the k item categories representing the optimal solution $A^g$ is output and displayed to the user in step 710 of the generalized multi-way search process 700 shown in FIG. 7.

Figure 10:
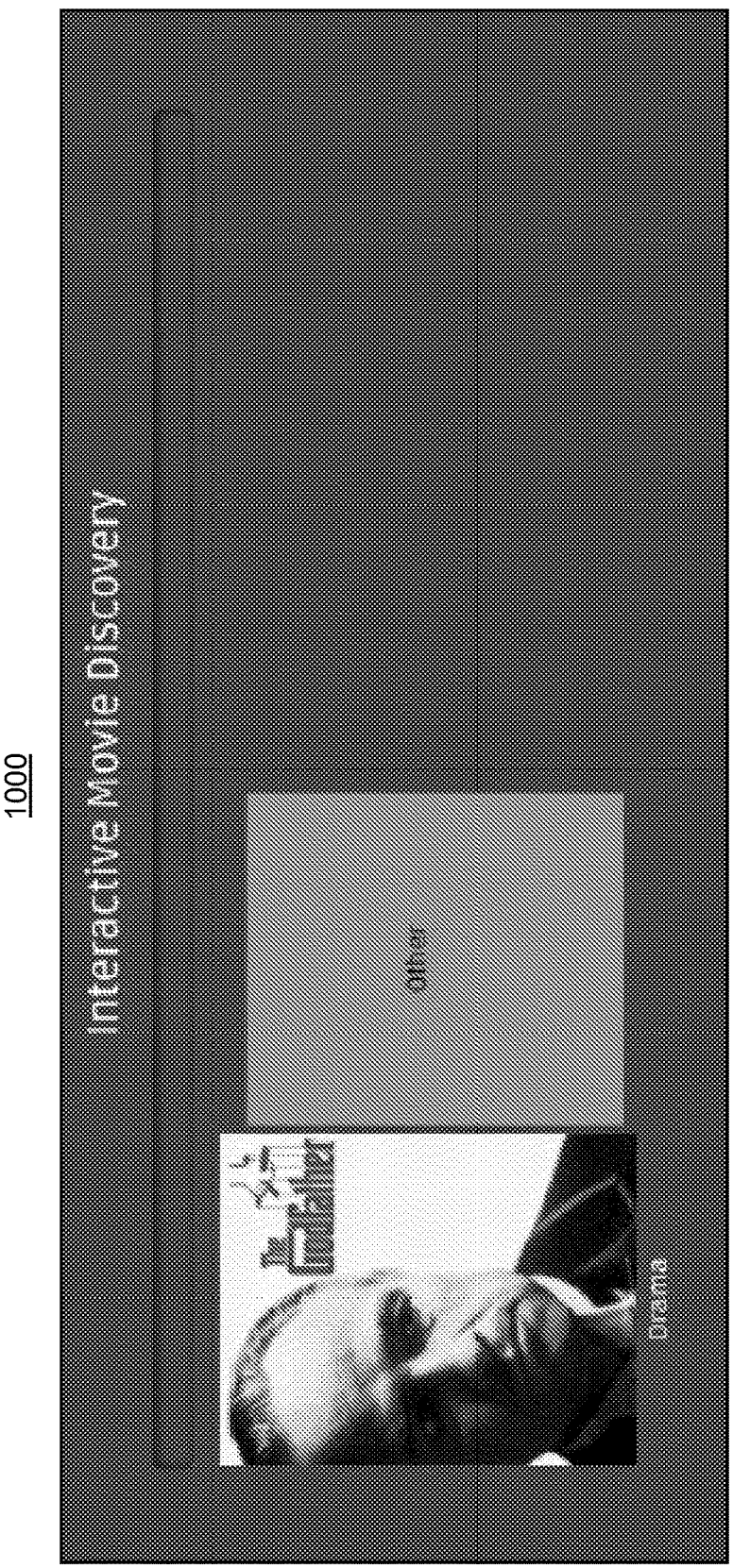
FIG. 10 is an exemplary embodiment of a user interface of the present disclosure.

Referring now to FIG. 10, an exemplary user interface 1000 is accordance with the present disclosure is shown. In the user interface 1000 a single category or question is presented to a user (i.e. k=1) along with an "other" option (i.e. the "k+1" choice). As the user interacts with the system (e.g., receiving device 108, back end server and content discovery application 118, usage database 120, control device 116 and/or display device 114) the system executes the generalized multi-way search process 700 of FIG. 7 and the greedy selection process 900 of FIG. 9. During the execution of these processes the user will repeatedly or iteratively be presented with the single category or question along with the "other" option until the user is presented with a final recommendation screen. In practice the user interface 1000 may be particularly useful in a TV environment where it is most efficient to display a few choices or questions to a user since the user may need use the arrow keys of the remote control to select displayed category or the other option. Although not shown, displaying two categories along with an "other" option (i.e., k=2) may also be useful in a TV environment. It should be appreciate that a user may make selections of displayed categories and the "other" option by making gestures with a remote control containing inertial sensors, as discussed in FIG. 4.

Figure 11:
FIG. 11 is another exemplary embodiment of a user interface of the present disclosure.

Referring now to FIG. 11, an exemplary user interface 1100 is accordance with the present disclosure is shown. In the user interface 1100 three categories or questions are presented to a user (i.e. k=3) along with the "other" option (i.e. the "k+1" choice). As the user interacts with the system (e.g., receiving device 108, back end server and content discovery application 118, usage database 120, control device 116 and/or display device 114) the system executes the generalized multi-way search process 700 of FIG. 7 and the greedy selection process 900 of FIG. 9. During the execution of these processes the user will repeatedly or iteratively be presented with three categories or questions along with the "other" option until the user is presented with a final recommendation screen. In practice the user interface 1100 may be particularly useful in a small touch screen environment (e.g., in a smartphone or handheld gaming platform) where it is more efficient to display a few more choices or questions than provided in the TV environment to a user since the user only needs to touch the touch screen of the small touch screen to select the desired category or the "other" option.

Figure 12:
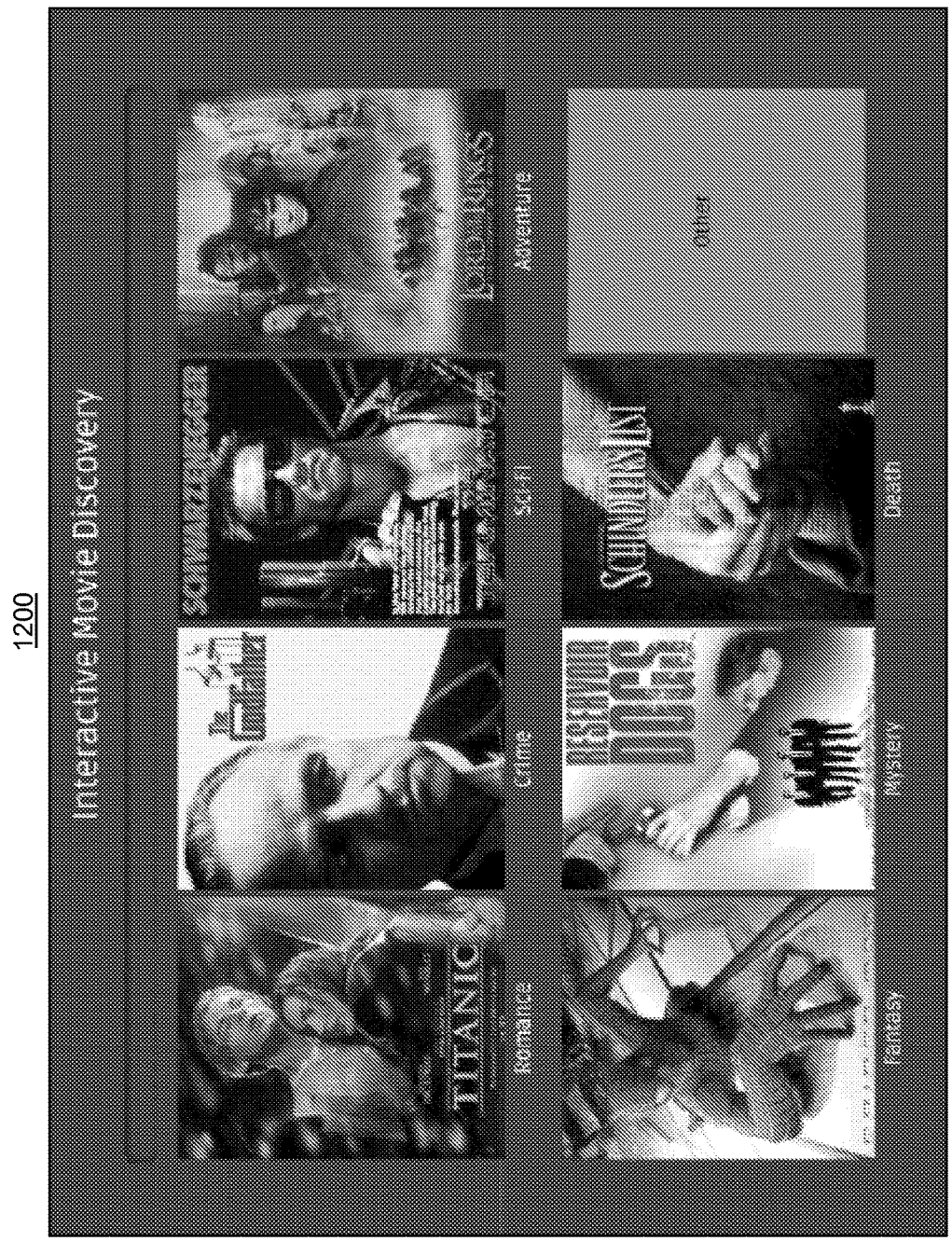
FIG. 12 is a further exemplary embodiment of a user interface of the present disclosure.

Referring now to FIG. 12, an exemplary user interface 1200 is accordance with the present disclosure is shown. In the user interface 1200 seven categories or questions are presented to a user (i.e. k=7) along with the "other" option (i.e. the "k+1" choice). As the user interacts with the system (e.g., receiving device 108, back end server and content discovery application 118, usage database 120, control device 116 and/or display device 114) the system executes the generalized multi-way search process 700 of FIG. 7 and the greedy selection process 900 of FIG. 9. During the execution of these processes the user will repeatedly or iteratively be presented with seven categories or questions along with the "other" option until the user is presented with a final recommendation screen. In practice the user interface 1200 may be particularly useful in a large touch screen environment (e.g., in a tablet) where it is more efficient to display a larger number of choices or questions than the number of questions provided in the TV environment or the small touch screen environment to a user since the user only needs to touch the touch screen of the large touch screen to select the desired category or the "other" option and the large touch screen has a large enough area to display a higher number of categories or questions.

Figure 13:
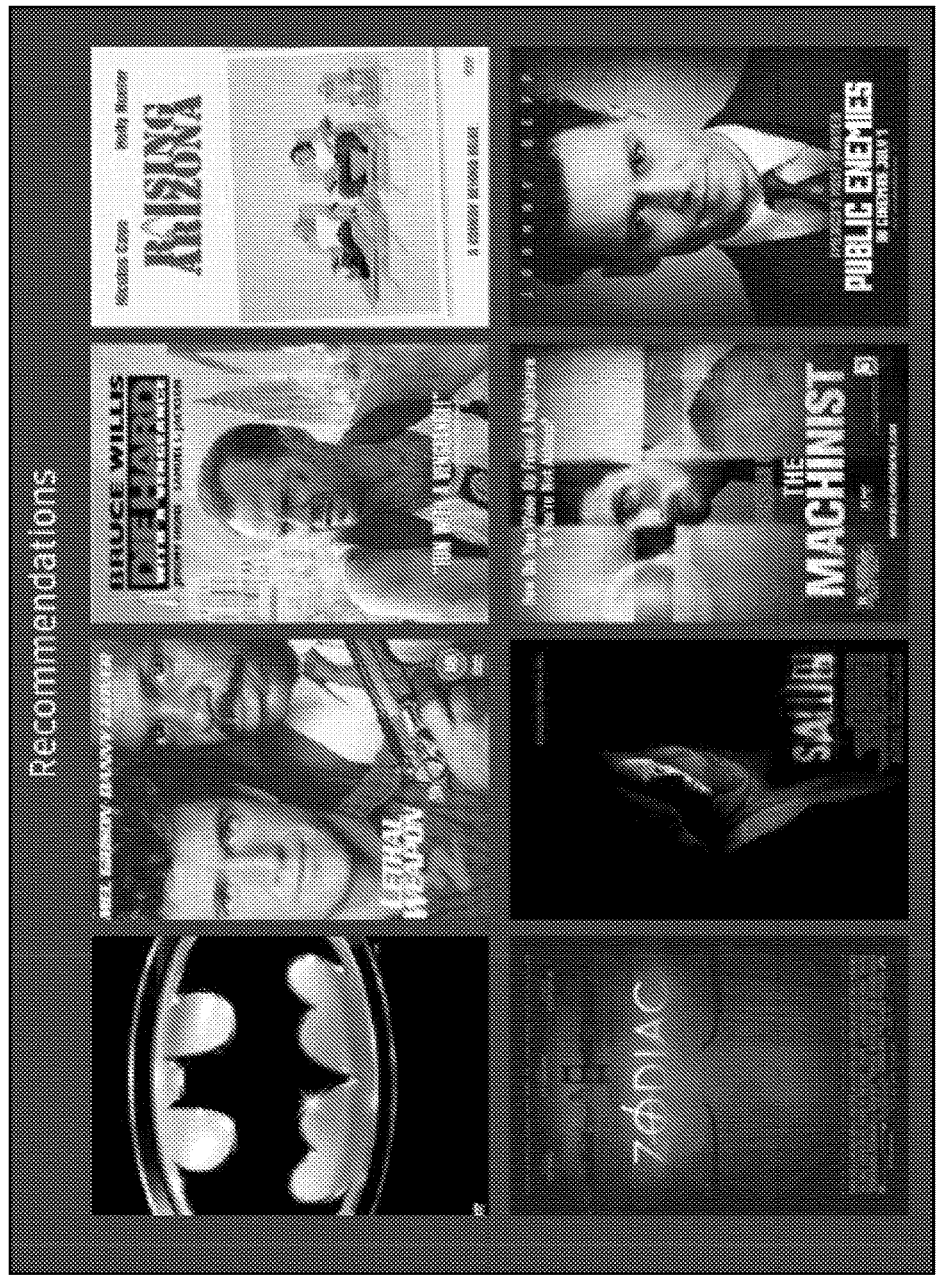
FIG. 13 is an exemplary embodiment of a user interface displaying final recommendations in accordance with the present disclosure.

Referring now to FIG. 13, an exemplary final recommendation screen or user interface 1300 of the present disclosure is shown. Screen 1300 is shown once the generalized multi-way search process 700 of FIG. 7 and the greedy selection process 900 of FIG. 9 are completed. Screen 1300 presents the user with a final selection of items (e.g., movies, restaurants, etc.) for the user to consume (e.g., reserve, purchase, view, download or the like).

Referring Now to FIG. 14, a recommendation process 1400 of the present disclosure is shown. Initially, at step 1402, a number of display regions (e.g., regions corresponding to k and k+1) are selected depending on a display type or display device. For example, as discussed above, one display region (k=1 as shown in FIG. 10) may be selected if the display device is a TV, three display regions (k=3 as shown in FIG. 11) may be selected if the display device is a small touch screen device, and seven display regions (k=7 as shown in FIG. 12) may be selected if the display device is a large touch screen device. Afterwards, at step 1404, item categories are selected to be displayed in the display regions in accordance with a content or item category discover process. The content discover process includes the generalized multi-way search process 700 of FIG. 7 and the greedy selection process 900 of FIG. 9.

Although embodiments which incorporate the teachings of the present disclosure have been shown and described in detail herein, those skilled in the art can readily devise many other varied embodiments that still incorporate these teachings. Having described preferred embodiments of a system, method and user interface for facilitating content discovery (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed is:

1. A method comprising:
   selecting a number of display regions based on a display type; and
   selecting at least one item category to be displayed in the number of selected display regions in accordance with a content discovery process, the content discovery process including:
      a multi-way search process which includes:
         tracking a user's item category selections; and removing non-selected item categories displayed in the number of selected display regions from future display in the number of selected display regions during the content discovery process;

an item category selection process which includes:

selecting at least one item category that has not been displayed in the number of selected display regions and was not previously non-selected during the multi-way search process;

retrieving from a memory the at least one item category that has not been displayed in the number of selected display regions and was not previously non-selected during the multi-way search process; and displaying the retrieved at least one item category during the content discovery process.

2. The method of claim 1, further comprising:

identifying an item category selected by a user; and changing the displayed at least one item category in the number of selected display regions based on the identified item category and the content discovery process.

3. The method of claim 1, wherein the number of selected display regions is different for different display types.

4. The method of claim 3, wherein the different display types include at least one of a TV, phone and tablet.

5. The method of claim 4, wherein the TV has less display regions than the phone which has less display regions than the tablet.

6. The method of claim 1, wherein the selection of the at least one item category is also based on the number of items in the at least one item category.

7. The method of claim 6, where the number of items in the at least one item category is greater than the number of items in other item categories that also have not been displayed in the number of selected display regions and were not previously non-selected.

8. The method of claim 1, wherein the multi-way search process and item category selection process are greedy processes.

9. A system comprising:

means for selecting a number of display regions based on a display type; and means for selecting at least one item to be displayed in the number of selected display regions in accordance with a content discovery process, the content discovery process including:

a multi-way search process that:

tracks a user's item category selections; and removes non-selected item categories displayed in the number of selected displayed regions from future display in the number of selected display regions during the content discovery process;

an item category selection process that:

selects at least one item category that has not been displayed in the number of selected display regions and was not previously non-selected during the multi-way search process;

means for retrieving from memory the at least one item category that has not been displayed in the number of selected display regions and was not previously non-selected during the multi-way search process; and means for displaying the retrieved at least one item category during the content discovery process.

10. The system of claim 9, comprising:

means for identifying an item category selected by a user; and means for changing the displayed at least one item category in the number of selected display regions based on the identified item category and the content discovery process.

11. The system of claim 9, wherein the number of selected display regions is different for different display types.

12. The system of claim 11, wherein the different display types include at least one of a TV, phone and tablet.

13. The system of claim 12, wherein the TV has less display regions than the phone which has less display regions than the tablet.

14. The system method of claim 9, wherein the selection of the at least one item category is also based on the number of items in the at least one item category.

15. The system of claim 14, where the number of items in the at least one item category is greater than the number of items in other item categories that also have not been displayed in the number of selected display regions and were not previously non-selected.

16. The system of claim 9, wherein the multi-way search process and item category selection process are greedy processes.

17. An apparatus comprising:

a controller; and a memory storing instructions configured to cause the controller to:

select a number of display regions based on a display type; and select at least one item category to be displayed in the number of selected display regions in accordance with a content discovery process, the content discovery process including:

a multi-way search process that:

tracks a user's item category selections and removes non-selected item categories displayed in the number of selected displayed regions from future display in the number of selected display regions during the content discovery process;

an item category selection process that:

selects at least one item category that has not been displayed in the number of selected display regions and was not previously non-selected during the multi-way search process;

retrieve, from the memory, the at least one item category that has not been displayed in the number of selected display regions and was not previously non-selected during the multi-way search process; and display, on a display, the retrieved at least one item category during the content discovery process.

18. The apparatus of claim 17, wherein the controller identifies an item category selected by a user, and changes the displayed at least one item category in the number of selected display regions based on the identified item category and the content discovery process.

19. The apparatus of claim 17, wherein the number of selected display regions is different for different display types.

20. The apparatus of claim 19, wherein the different display types include at least one of a TV, phone and tablet.

21. The apparatus of claim 20, wherein the TV has less display regions than the phone which has less display regions than the tablet.

22. The apparatus of claim 17, wherein the selection of the at least one item category is also based on the number of items in the at least one item category.

23. The apparatus of claim 22, wherein the number of items in the at least one item category is greater than the number of items in other item categories that also have not been displayed in the number of selected display regions and were not previously non-selected.

24. The apparatus of claim 17, wherein the multi-way search process and item category selection process are greedy processes.

* * * * *